United States Patent
Evans et al.

(10) Patent No.: US 12,110,373 B2
(45) Date of Patent: Oct. 8, 2024

(54) NON-HAZARDOUS WATER-BASED POLYURETHANE DISPERSION

(71) Applicant: SIKA TECHNOLOGY AG, Baar (CH)

(72) Inventors: Craig Evans, Greater Manchester (GB); Neil Carter, Southport (GB); Ian Martin, Barrow (GB)

(73) Assignee: SIKA TECHNOLOGY AG, Baar (CH)

( * ) Notice: Subject to any disclaimer, the term of this patent is extended or adjusted under 35 U.S.C. 154(b) by 842 days.

(21) Appl. No.: 17/082,143

(22) Filed: Oct. 28, 2020

(65) Prior Publication Data

US 2021/0054229 A1    Feb. 25, 2021

Related U.S. Application Data

(62) Division of application No. 15/776,539, filed as application No. PCT/EP2016/082048 on Dec. 21, 2016, now abandoned.

(30) Foreign Application Priority Data

Dec. 22, 2015  (EP) ..................... 15202177

(51) Int. Cl.
| | | |
|---|---|---|
| *B05D 1/00* | (2006.01) | |
| *C08G 18/08* | (2006.01) | |
| *C08G 18/10* | (2006.01) | |
| *C08J 7/043* | (2020.01) | |
| *C08J 7/046* | (2020.01) | |
| *C09D 175/04* | (2006.01) | |
| *C09D 175/12* | (2006.01) | |

(52) U.S. Cl.
CPC ............... *C08J 7/043* (2020.01); *B05D 1/00* (2013.01); *C08G 18/0847* (2013.01); *C08G 18/10* (2013.01); *C08J 7/046* (2020.01); *C09D 175/04* (2013.01); *C09D 175/12* (2013.01); *B05D 2401/20* (2013.01); *B05D 2503/00* (2013.01)

(58) Field of Classification Search
CPC ... B05D 1/00; B05D 2401/20; B05D 2503/00
See application file for complete search history.

(56) References Cited

U.S. PATENT DOCUMENTS

| 5,169,895 A | 12/1992 | Coogan et al. | |
|---|---|---|---|
| 2002/0103292 A1* | 8/2002 | Blum | C09D 175/04 524/879 |
| 2003/0203991 A1* | 10/2003 | Schottman | C09D 7/61 523/334 |
| 2013/0316098 A1 | 11/2013 | Lubnin et al. | |
| 2015/0315527 A1 | 11/2015 | Malaba et al. | |

FOREIGN PATENT DOCUMENTS

WO    WO-2016144753 A1 *  9/2016  ............. C08G 18/42

OTHER PUBLICATIONS

Mar. 7, 2017 International Search Report issued in International Patent Application No. PCT/EP2016/082048.
Mar. 7, 2017 Written Opinion of the International Searching Authority issued in International Patent Application No. PCT/EP2016/082048.
Aug. 7, 2019 Office Action issued in U.S. Appl. No. 15/776,539.
Jul. 28, 2020 Office Action Issued in U.S. Appl. No. 15/776,539.

\* cited by examiner

*Primary Examiner* — Hai Y Zhang
(74) *Attorney, Agent, or Firm* — Oliff PLC

(57) ABSTRACT

Water-based polyurethane dispersion methodology relating to a chain-extended polyurethane, characterized in that the polyurethane dispersion includes 2, 5, 7, 10-tetraoxaundecane. The water-based polyurethane dispersion is suitable as a non-hazardous water-based coating composition for coatings with a particularly good adhesion on plastic or rubber substrates. The solvent 2, 5, 7, 10-tetraoxaundecane contained therein imparts good film coalescing, good adhesive properties and high strength of the polyurethane dispersion.

6 Claims, No Drawings

NON-HAZARDOUS WATER-BASED POLYURETHANE DISPERSION

CONTINUITY INFORMATION

This is a Division of application Ser. No. 15/776,539 filed May 16, 2018, which is a National Phase of International Application No. PCT/EP2016/082048 filed Dec. 21, 2016, which claims the benefit of European Application No. 15202177.0 filed Dec. 22, 2015. The disclosures of the prior applications are hereby incorporated by reference herein in their entireties.

TECHNICAL FIELD

The invention relates to water-based polyurethane dispersions and their use for coatings on plastic or rubber substrates.

BACKGROUND OF THE INVENTION

Water-based polyurethanes dispersions (PUDs) are one of the fastest growing fields in the coating industry due to their technological advances that has made them an effective substitute for the corresponding solvent based coatings. PUDs are used in many industrial and commercial applications.

Water-based polyurethane dispersions usually include solvents which are often necessary for formulating PUDs and/or preparing precursors thereof. There are countless commercially available water-based polyurethane dispersions containing pyrrolidone solvents. These have been industry standard for many years. To move away from pyrrolidone solvents, the same results could be achieved by using different solvents. Typical examples of other solvents include glycol ethers and dimethylsulphoxide (DMSO). PUDs can also be prepared solvent free if the dispersed polymer is soft enough to coalesce on its own. There is however only a limited range of applications for solvent free PUDs.

Many attempts have been made to provide alternative solvents. The use of alternative solvents has typically failed because the solvation power of the alternative solvents is not good enough. They either do not dissolve the required components sufficiently or require such large amounts of solvent, that the volatile organic content (VOC) of the finished product is unacceptably high.

Other solvents may also be hazardous to varying degrees. These hazards carry through to the final product and result in hazard classifications that are unwanted.

Moreover, polyurethane dispersions including the conventional solvents used are often not satisfactory with respect to the substrate adhesion when they are used as coatings for plastic or rubber substrates.

Solvent free PUDs have a limited range of applications because the polymer must coalesce on its own. At ambient temperatures this means using soft polymers that would not be suitable for hard wearing or tough applications. If a rigid polymer was prepared solvent free, it would require heated drying to achieve film formation. This is an energy and labour intensive process that not all users of PUDs have access to.

US 2013/0316098 A1 relates to an aqueous cationic polyurethane dispersion comprising an aqueous dispersion of polyurethane having tethered tertiary amino groups separated from backbone by at least two intervening atoms or terminal tertiary amino groups with multiple tertiary amino groups per terminus. Solvents may be used but are not preferred. A number of examples for solvents are mentioned, inter alia ethylene glycol monomethyl ether formal.

SUMMARY OF THE INVENTION

Accordingly, an object of the invention was to provide polyurethane dispersions which can overcome the drawbacks of the prior art discussed above. In particular, an object was to provide polyurethane dispersions with good film forming properties and substrate adhesion, especially when used for coating plastic or rubber substrates.

Moreover, hazardous solvents and high amount of solvents should be avoided in order to obtain a more environmentally friendly product. In addition, it should be possible to prepare the polyurethane dispersion by a method of manufacture under convenient conditions.

Surprisingly, it was found that the above object could be solved by using 2,5,7,10-tetraoxaundecane (TOU) as a solvent in polyurethane dispersions, especially for use in coatings for plastics or rubber.

Accordingly, the invention is related to a water-based polyurethane dispersion comprising a chain-extended polyurethane, wherein the polyurethane dispersion comprises 2,5,7,10-tetraoxaundecane. In a typical embodiment, the chain-extended polyurethane has carboxylate groups.

In particular, the invention refers to the use of 2,5,7,10-tetraoxaundecane (TOU) as a coalescent in polyurethane dispersions, particularly for use in plastics or rubber coatings.

TOU as a coalescent is surprisingly advantageous in several purposes. Firstly, it can act as a solvent and/or diluent in the preparation of the polyurethane dispersion. Moreover, it serves as an efficient film coalescing aid during curing of the dispersion, thus improving the film forming properties. And finally, TOU improves the adhesion to plastic or rubber substrates. It brings benefits to film adhesion and promotes a stronger bond between the substrate and dried PUD film. Thus, a non-hazardous water-based coating composition can be provided for use on plastic or rubber substrates.

As to the application on plastic or rubber substrates, the inventive PUD can modify and/or improve the surface of plastic or rubber substrates to suit customers requirements. These requirements can be very varied as explained previously.

Surprisingly, the PUD containing TOU shows not only good film forming and adhesion properties, but also a very high tensile strength with good elongation. Its tensile strength is markably higher than that of a conventional PUD containing N-methyl-2-pyrrolidone (NMP) or N-ethyl-2-pyrrolidone as solvent (NEP) instead of TOU.

The invention is also related to a process for producing the polyurethane dispersion, a coating composition comprising the polyurethane dispersion and the use of TOU as coalescent for PUD, particularly rigid PUDs. Preferred embodiments of the invention are described in the dependent claims.

DETAILED DESCRIPTION OF THE INVENTION

Substance names beginning with "poly", such as e.g. polyol, polyisocyanate or polyurethane, designate substances which formally contain, per molecule, two or more of the functional groups occurring in their names. A polyol is e.g. a substance having two or more hydroxyl groups.

An isocyanate-terminated polymer is a polymer or prepolymer having at least one terminal isocyanate group, in particular two terminal isocyanate groups. The term prepolymer here generally refers to oligomers or polymers which are used as intermediate products for producing polymers with higher molecular weight.

Chain extenders are difunctional compounds, i.e. compounds having two functional groups which are reactive with functional groups, usually terminal functional groups, of a prepolymer so that the chain extender can react with the prepolymer to form a chain-extended polymer.

The average molecular weight is understood to mean the number average molecular weight, as determined using conventional methods, preferably by gel permeation-chromatography (GPC) using polystyrene as standard, styrene-di-vinylbenzene gel with porosity of 100 Angstrom, 1000 Angstrom and 10000 Angstrom as the column and tetrahydrofurane as a solvent, at 35° C.

In the following the invention is described with respect to the PUD product and the method for producing it, respectively. Details given for the product of course equally apply to the method and vice versa, e.g. with respect to the starting materials and their proportions, where applicable.

The invention relates to a water-based polyurethane dispersion comprising a chain-extended polyurethane, wherein the polyurethane dispersion comprises 2,5,7,10-tetraoxaundecane.

The solvent 2,5,7,10-tetraoxaundecane, abbreviated TOU, is a well-known compound and can be prepared by the skilled person according to known synthesis procedures. TOU is commercially available from a number of suppliers. It can act as a solvent and/or diluent and/or coalescent in the water based PUD.

A particular surprising benefit of TOU in the PUD is that TOU acts as an adhesion promoter to plastic or rubber substrates when the inventive PUD is used for coating plastic or rubber substrates.

Another surprising benefit of TOU in the PUD is that the cured PUD has a very high strength, markably higher than a corresponding PUD with NMP or NEP instead of TOU.

Water-based polyurethane dispersions are aqueous dispersions of polyurethane particles. The polyurethane particles are stabilized ionically or non-ionically. Accordingly, PUDs have been classified into three categories, namely anionic, cationic and non-ionic PUDs, wherein the PUD is stabilized by anionic groups, cationic groups or hydrophilic units, respectively, contained in the polyurethane. Hence, the water-based polyurethane dispersion of the invention can be an anionic, cationic or non-ionic water-based polyurethane dispersion.

Anionic PUDs are usually stable at alkaline pH values>7. Cationic PUDs are usually stable at acid pH<7 and normally based upon alkylated or protonated tertiary amines. Non-ionic PUDs are non-ionisable and often stable over a very wide pH range.

The chain-extended polyurethane of the water-based polyurethane dispersion may have ionic groups or hydrophilic non-ionic groups. The chain-extended polyurethane of the water-based polyurethane dispersion may have anionic groups such as carboxylate groups or sulfonate groups, cationic groups such as ammonium cations, e.g. alkylated or protonated secondary or tertiary amines, or non-ionic hydrophilic units such as polyethylene oxide units. The non-ionic hydrophilic units may be contained in the backbone chain of the polyurethane or are preferably contained in pendant or terminal groups of the polyurethane. The ionic groups, in particular carboxylate groups, may be pendant groups or contained in pendant side groups of the polyurethane.

It is preferred that the chain-extended polyurethane has anionic groups such as carboxylate groups or sulfonate groups, in particular carboxylate groups.

The counter ion of the anionic groups, such as carboxylate groups, may be any conventional counter ion, e.g. alkali metal ions, alkaline earth metal ions, $NH_4^+$ or organic ammonium ions. Organic ammonium ions having one or more organic groups, in particular alkyl groups, are preferred. The counter ion of the cationic groups, such as ammonium groups, may be any conventional counter ion, e.g. $OH^-$, halogenid anions or complex anions such as $BF_4^-$. Particularly preferred is trimethyl ammonium or triethyl ammonium.

The water-based polyurethane dispersion may comprise e.g. 1 to 20% by weight, preferably 5 to 15% by weight, of 2,5,7,10-tetraoxaundecane, based on the total weight of the water-based polyurethane dispersion.

The water-based polyurethane dispersion may comprise e.g. 3 to 60% by weight, preferably 10 to 40% by weight, of 2,5,7,10-tetraoxaundecane, based on the total weight of the chain-extended polyurethane in the water-based polyurethane dispersion.

The water-based polyurethane dispersion may comprise e.g. 45 to 80% by weight, preferably 50 to 75% by weight, of water, based on the total weight of the water-based polyurethane dispersion.

The water-based polyurethane dispersion may comprise e.g. 20 to 55% by weight, preferably 25 to 50% by weight, of the chain-extended polyurethane, preferably the chain-extended polyurethane having carboxylate groups, based on the total weight of the water-based polyurethane dispersion.

The water-based polyurethane dispersion may optionally comprise one or more additives, which are common for PUDs, in particular for PUDs used as coating compositions. Examples of suitable additives are defoamers, surfactants, rheological additives, thickening agents or organic solvents, which are different from TOU, such as e.g. butyl diglycol or isopropyl alcohol. Suitable commercial products of such additives are e.g. Byk® 012, Byk® 024, Byk® 348, Surfynol® MD20, Rheovis® PU1214 or Borchi Gel® CW44.

The chain-extended polyurethane in the PUD is preferably the reaction product of an isocyanate-terminated polyurethane prepolymer and at least one chain extender, which is preferably a polyamine, wherein the isocyanate-terminated polyurethane prepolymer preferably has ionic groups, in particular carboxylate groups.

In the chain-extended polyurethane, the acid groups or amine groups, if present, are completely or partially converted into ionic groups with a base or an acid. Suitable starting materials are described in the following.

The isocyanate-terminated polyurethane prepolymer is preferably a reaction product of
 at least one first polyol,
 at least one second polyol, which is different from the first polyol, and
 at least one diisocyanate,
 wherein the at least one second polyol is preferably selected from a polyether polyol having ethylene oxide units, a polyol having an acid group, preferably a carboxyl group, and a polyol having an amine group.

Most preferred is a second polyol having a carboxylate group.

The at least one first polyol may be one or more polyols. There is a huge variety in the potential polyols. The polyol may have two or more hydroxyl groups, e.g. a diol or a triol or a mixture thereof. The at least one polyol is however preferably one or more diols, e.g. one diol or a mixture of two or more diols.

Examples of suitable first polyols are polyoxyalkylenepolyols, also referred to as polyetherpolyols, polyesterpolyols, polycarbonatepolyols, poly(meth)acrylate polyols, polyhydrocarbon-polyols, polyhydroxy-functional acrylonitrile/butadiene copolymers and mixtures thereof, wherein said polyols are preferably diols.

Examples of polyetherpolyols are polyoxyethylenepolyols, polyoxypropylene-polyols and polyoxybutylenepolyols, in particular polyoxyethylenediols, poly-oxypropylenediols, polyoxybutylenediols, polyoxyethylenetriols and polyoxypropylenetriols. Further examples of polyetherpolyols are so-called ethylene oxide-terminated ("EO-endcapped", ethylene oxide-end-capped) polyoxypro-pylenepolyols, or styrene-acrylonitrile-grafted polyetherpolyols.

Examples of polyesterpolyols are polyesterdiols obtained from the reaction of difunctional alcohols, such as 1,2-ethanediol, diethylene glycol, 1,2-propanediol, dipropylene glycol, 1,4-butanediol, 1,5-pentanediol, 1,6-hexanediol, 1,4-cyclohexane dimethanol or neopentylglycol, with dicarbonic acids or anhydrides or esters thereof, such as succinic acid, glutaric acid, adipinic acid, suberic acid, sebacinic acid, dodecane dicarbonic acid, maleinic acid, fumaric acid, phthalic acid, isophthalic acid, terephthalic acid or hexahydro terephthalic acid, or polyesterdiols obtained from the polymerization of lactones, particularly 6-caprolactone.

Examples of polycarbonatepolyols are polycarbonatepolyols obtained from the reaction of difunctional alcohols, such as 1,2-ethanediol, diethylene glycol, 1,2-propanediol, dipropylene glycol, 1,4-butanediol, 1,5-pentanediol, 1,6-hexanediol, 1,4-cyclohexane dimethanol or neopentylglycol or mixtures thereof, with dialkyl carbonates or diaryl carbonates oder phosgene.

Further examples of polyols to be used in the present invention are polyhydroxy-functional fats and oils, for example natural fats and oils, or polyols obtained by chemical modification of natural fats and oils, so-called oleochemical polyols.

The first polyol contains preferably at least one polyester polyol or polycarbonate polyol. Such polyols enable rigid PUDs with high strength.

The first polyol preferably has an average molecular weight of from 400 to 10'000 g/mol, preferably from 500 to 8'000 g/mol, more preferably from 500 to 4'000 g/mol, most preferably from 500 to 2'000 g/mol, and/or an average OH functionality in the range from 1.6 to 2.5, preferably from 1.8 to 2.0.

A particularly preferred polyol to be used as the first polyol is a polycarbonate diol, preferably with an average molecular weight of from 500 to 2'000 g/mol. Such polyols are commercially available. Such polyols enable rigid PUDs with high strength The at least one second polyol is different from the at least one first polyol. It is preferably selected from a polyether polyol having ethylene oxide units, a polyol having an acid group, preferably a carboxyl group, and a polyol having an amine group.

Examples of a polyether having ethylene oxide units are polyetherpolyols having ethylene oxide units such as polyethylene glycol, or polyethylene glycol dialkylethers or polyethylene glycol monoalkylethers, wherein two primary hydroxyl groups are incorporated in the polymer. A preferred polyether having ethylene oxide units may be a difunctional polyethylene glycol monomethyl ether, wherein two primary hydroxyl groups are incorporated in the polymer such as Ymer® N120 (from Perstorp).

The polyol having an acid group is preferably a diol having a carbonic or sulfonic acid group, preferably a carboxyl group. Particularly preferred is dimethylol propionic acid (DMPA) or dimethylol butanoic acid (DMBA).

The polyol having an amine group has preferably one or two, particularly one, tertiary amine group. It is preferably a diol. Particularly preferred is N-alkyl-diethanolamine, wherein alkyl is preferably $C_1$-$C_4$-alkyl such as ethyl or methyl. N-methyl-diethanolamine is particularly preferred.

Particularly preferred as second polyol is a polyol having a carboxyl group, such as dimethylol propionic acid (DMPA) or dimethylol butanoic acid (DMBA). Most preferred is DMPA.

Low molecular weight di- or polyhydric alcohols, e.g. with a molecular weight of less than 250 g/mol, can be used together with the first and the second polyol. Examples thereof are 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol or mannitol, sugars, such as sucrose, other alcohols having a higher functionality, low molecular weight alkoxylation products of the abovementioned di- and polyhydric alcohols, and mixtures thereof.

The at least one diisocyanate may be one or more diisocyanate. There is a huge variety in the potential diisocyanates. Suitable diisocyanates are those which are amply known in polyurethane chemistry, or combinations thereof. Suitable diisocyanates are aliphatic or aromatic diisocyanates, wherein aliphatic diisocyanates are preferred. Aliphatic diisocyanates include cycloaliphatic diisocyanates wherein at least one isocyanate is bound to cycloaliphatic carbon atom. Cycloaliphatic diisocyanates are particularly suitable.

Examples of suitable aliphatic diisocyanates, including cycloaliphatic diisocyanates are 1,6-diisocyanatohexane (HDI), 1-isocyanato-5-isocyanatomethyl-3,3,5-trimethylcyclohexane (IPDI), bis-(4-isocyanatocyclohexyl)methane ($H_{12}$ MDI), 1,3-bis(1-isocyanato-1-methylethyl)benzene (m-TMXDI or TMXDI) and/or technical-grade isomer mixtures or derivatives thereof. Examples of suitable aromatic polyisocyanates are 2,4(6)-diisocyanatotoluene (TDI) and bis(4-iso-cyanatophenyl)methane (MDI).

Particularly preferred as diisocyanate is bis(4-isocyanatocyclohexyl) methane, isophorone diisocyanate or TMXDI.

Most preferred is bis(4-isocyanatocyclohexyl) methane. This diisocyanate enables rigid PUDs with high strength.

If the isocyanate-terminated polyurethane prepolymer contains carboxyl groups, these are at least partly neutralized with a suitable base and converted into carboxylic anions. The neutralization typically takes place after the reaction of the polyols with the diisocyanate is completed and before the isocyanate-terminated polyurethane prepolymer is mixed with water.

Examples of suitable bases for neutralization are tertiary amines such as trimethylamine, triethylamine, triisopropylamine N,N-dimethylethanolamine, N-methyldiethanolamine, N-methyldiisopropanolamine, dimethylisopropanolamine, N-methylmorpholine, N-ethylmorpholine or triethanolamine, or alkali metal hydroxides such as lithium hydroxide, sodium hydroxide, or potassium hydroxide or mixtures thereof.

Preferred thereof are trimethylamine, triethylamine, n-ethyl morpholine or methyl diethanolamine or mixtures thereof. Particularly preferred is trimethylamine or triethylamine.

If the isocyanate-terminated polyurethane prepolymer contains amine groups, these are at least partly neutralized with a suitable acid and converted into ammonium cations. The neutralization typically takes place after the reaction of the polyols with the diisocyanate is completed and before the isocyanate-terminated polyurethane prepolymer is mixed with water.

Examples of suitable acids for neutralization are carboxylic acids such as acetic acid, HCl or phosphoric acid.

Finally, the isocyanate-terminated polyurethane prepolymer is mixed with water and chain extended with a suitable chain extender.

The chain extender may be selected from at least one of water, inorganic or organic polyamine having an average of about two or more primary and/or secondary amine groups, amine functional polyoxyalkylenes, ureas, or their combinations, wherein polyamines are preferred. Particularly preferred are diamines with two primary and/or secondary amine groups. Polyamines as used herein also refer to polyhydrazines, in particular dihydrazides. The polyamine is preferably a linear or branched alkylenediamine, e.g. a linear or branched $C_{2-12}$-alkylenediamine, or a cycloalkane or alkyl substituted cycloalkane having two amine groups.

Suitable examples of chain extenders include ethylene diamine (EDA), diethylenetriamine (DETA), 1,3-bisaminomethylbenzol (meta-xylenediamine or MXDA), aminoethylethanolamine (AEEA), urea or derivatives of urea, adipic dihydrazide, hexamethylenediamine (HAD), hydrazine, isophoronediamine (IPDA), 2-methylpentamethylenediamine (MPMD) or any desired combinations of these chain extenders.

Preferred chain extenders are EDA, MPMD or HDA.

The invention further relates to a process for producing the water-based polyurethane dispersion as described above, the process comprising the steps of
a) reacting at least one first polyol, at least one second polyol and at least one diisocyanate in the presence of 2,5,7,10-tetraoxaundecane and optionally a catalyst to form an isocyanate-terminated polyurethane prepolymer, wherein the second polyol is different from the first polyol,
b) optionally at least partly neutralizing the isocyanate-terminated polyurethane prepolymer to obtain a neutralized isocyanate-terminated polyurethane prepolymer, and
c) dispersing the optionally neutralized prepolymer in water and adding a chain extender, preferably a polyamine, to obtain the water-based polyurethane dispersion comprising the chain-extended polyurethane and 2,5,7,10-tetraoxaundecane.

Neutralization of the prepolymer (step b) is preferred for prepolymers containing a second polyol with acid or amine groups.

The starting materials for the process are described above. The proportions of the starting materials may vary to a large extent depending on the starting materials used and the desired properties of the prepolymer to be produced.

Preferably the at least one second polyol has carboxyl groups and is dimethylol propionic acid (DMPA) and/or the at least one diisocyanate is an aliphatic diisocyanate, preferably bis(4-isocyanatocyclohexyl) methane.

The base to neutralize the acid groups is preferably a tertiary amine.

The isocyanate-terminated prepolymer is preferably made from a mixture comprising e.g. 20 to 70%, preferably 30 to 60%, by weight of one or more first polyols, 1 to 20%, preferably 2.5 to 10%, by weight of one or more second polyols and 10 to 60%, preferably 20 to 60%, by weight of one or more diisocyanates, based on the total weight of first polyols, second polyols and diisocyanates.

This mixture contains preferably 3 to 60% by weight, particularly 10 to 40% by weight, of 2,5,7,10-tetraoxaundecane based on the total weight of first polyols, second polyols, diisocyanates and 2,5,7,10-tetraoxaundecane.

In order to obtain an isocyanate-terminated polyurethane prepolymer the diisocyanate is used in excess, i.e. the molar ratio of isocyanate groups to hydroxyl groups (NCO/OH ratio) in the mixture to be polymerized in step a) is greater than 1 and preferably in the range of 1.5 to 2.5 more preferably 1.8 to 2.2.

The process steps a) to c) may be carried out under an inert gas atmosphere. In particular, it is preferred that first step a) is carried out under an inert gas atmosphere.

In the first step a) the polyols and the diisocyanate are reacted in the presence of 2,5,7,10-tetraoxaundecane and optionally a catalyst.

The reaction to obtain the isocyanate-terminated polyurethane prepolymer may be carried out in accordance with common polyurethane synthesis. In a preferred embodiment, the first polyol and TOU are mixed until homogeneous, followed by the addition of the diisocyanate. If the first polyol is solid at room temperature, it is preferably melted before adding.

The second polyol may be added at any time. If it is solid at room temperature, it may be dissolved in TOU before addition or not. In a preferred embodiment the second polyol is DMPA and is added in solid state, e.g. into a mixture of TOU, first polyol and diisocyanate.

Before addition of an optional catalyst, mixing of the components is preferably carried out under stirring and heating. Stirring under elevated temperature for a certain time is usually suitable in order to obtain a homogenous mixture and optionally to reduce residual water contained in the starting materials. Depending on the starting materials added, it may be suitable to continue stirring under elevated temperature for a certain time before adding the next starting material.

The mixing and stirring of the starting materials is preferably carried out under an elevated temperature which depends on the starting materials used. A suitable temperature during mixing and before addition of a optionally present catalyst is e.g. in the range of 60 to 100° C., preferably 70 to 90° C. The temperature during mixing may be gradually raised.

If a catalyst is used, it is usually added as the last component. One or more catalysts may be used. A huge range of catalysts suitable for polyurethane synthesis may be used. The skilled person is familiar with these catalysts. Examples of suitable catalysts are organotin compounds, tertiary amines, organobismuth compounds, organozirconium compounds, organoruthenium compounds, organotitanium compounds, organoiron compounds, organo-molybdenum compounds and organozinc compounds.

Examples of organotin catalysts are dibutyl tin dilaurate, dibutylbis(laurylthio)-stannate, dibutyltinbis(isooctylmercapto acetate) or dibutyltinbis(isooctylmaleate), or tin octaoate. Examples of tertiary amines are DABCO, pentam-etyldi-propylenetriam ine, bis(dimethylamino ethyl ether), pentamethyldiethylenetri-amine, DBU phenol salt, dimethylcyclohexylamine, 2,4,6-tris(N,N-dimethyl-aminomethyl) phenol (DMT-30), 1,3,5-tris(3-dimethylaminopropyl)hexahydro-s-triazine.

Further examples of catalysts are Bi(III) complex compounds or Zr(IV) complex compounds, particularly with ligands selected from alkoholates, carboxylates, 1,3-diketonates, oxinate, 1,3-ketoesterates and 1,3-ketoamidates.

After addition of the optionally present catalyst, stirring under heating is continued. The polymerization may be carried out e.g. at a temperature in the range of 80 to 120° C., preferably 80 to 100° C. The progress of the reaction can be controlled by determining the NCO content in the mixture. If the desired or theoretical NCO content is reached, the reaction is complete and the mixture can optionally be cooled down to a lower temperature, e.g. in the range of 20 to 80° C. The mixture contains an isocyanate-terminated prepolymer.

In the case, a second polyol having an acid group or an amine group is used to prepare the prepolymer, subsequently, a base, in case of polyol with an acid group, or an acid, in case of polyol with an amine group, is added to the obtained isocyanate-terminated polyurethane prepolymer to convert the acid groups or amine groups, respectively, completely or partially into ionic groups. The amount of the base or acid added is preferably such that at least 50%, more preferably at least 80% and still more preferably 90 to 100% of the acid or amine groups, preferably carboxyl groups, of the isocyanate-terminated prepolymer are converted into ionic groups.

After neutralization, the prepolymer having ionic groups, in particular carboxylate groups, is obtained. The neutralized isocyanate-terminated polyurethane prepolymer containing 2,5,7,10-tetraoxaundecane is now ready to be dispersed in water.

In the step c) the neutralized isocyanate-terminated polyurethane prepolymer having ionic groups is dispersed in water and the chain extender, preferably a polyamine, is added. The amount of water used for dispersion is preferably such that the water content desired for the polyurethane dispersion is achieved.

The temperature of the neutralized prepolymer in step c) is preferably in the range of 15 to 100° C., more preferably 30 to 80° C.

The temperature of the water in step c) is preferably in the range of 2 to 30° C., more preferably 5 to 25° C.

While or short after the precursor is dispersed in water, the chain extender is added e.g. in pure form or dissolved or dispersed in water. The chain extender reacts with the dispersed prepolymer, forming the chain-extended polyurethane. The chain-extender is preferably used in such an amount, that its reactive groups, preferably primary or secondary amine groups, are present in a ratio in the range of 0.8 to 1.1, preferably 0.9 to 1, compared to the isocyanate groups.

The chain extension of the polyurethane prepolymer leads to an increase of the molecular weight and the formation of a water-based polyurethane dispersion comprising a chain-extended polyurethane. The reactive isocyanate groups react with the functional groups of the chain extender substantially more quickly than with water. After chain-extension, any remaining free isocyanate groups are usually reacted with water under further chain extension.

After chain extension the water-based polyurethane dispersion comprising the chain-extended polyurethane and 2,5,7,10-tetraoxaundecane is obtained.

It is also possible to prepare the polyurethane dispersion by making step a) without 2,5,7,10-tetraoxaundecane and add 2,5,7,10-tetraoxaundecane before or after step b) is made.

Another embodiment of the invention is a coating composition comprising the polyurethane dispersion described above and at least one further ingredient selected from other polymer dispersions, fillers, pigments, other solvents, stabilizers, defoamers, surfactants, rheological additives, thickening agents and antioxidants.

Other polymers dispersions are polymer dispersions different from the polyurethane dispersion described herein. Other solvents are solvents different from TOU.

Additionally, the coating composition may contain any further ingredient which is typically used in water-based coatings.

The coating composition or the inventive polyurethane dispersion can be used for coating any substrates. They are especially suitable for coating a plastic substrate or a rubber substrate. The plastic or rubber substrate may be of any plastic type or rubber type known, for example rigid or soft PVC, polycarbonate, polystyrene, polyester, PET, polyamid, PMMA, ABS, SAN, epoxy resin, phenolic resin, PUR, POM, TPO, PE, PP, EPM or EPDM, which can be surface treated, e.g. by plasma, corona or flame, or untreated. Preferred plastics are polycarbonate, polyester, PET, polypropylene, in particular biaxially orientated polypropylene or PVC, particularly rigid PVC.

The plastic or rubber substrate may be e.g. a plastic or rubber article or an article having at least in part a plastic or rubber surface to be coated. The plastic or rubber substrate may be in the form of a plastic or rubber plate, a plastic or rubber sheet, a plastic or rubber object, e.g. a window frame, plastic or rubber fibres, a plastic or rubber cable or plastics or rubber woven into textiles.

The coating composition or the inventive polyurethane dispersion is particularly useful for coating rigid PVC, such as window frames out of rigid PVC.

The invention also relates to a process for coating a plastic substrate or a rubber substrate, comprising applying the coating composition or the inventive polyurethane dispersion on a plastic or rubber substrate and hardening the applied coating or dispersion.

The application of the water-based polyurethane dispersion onto the plastic or rubber substrate may be carried out by any conventional method known to the skilled person, e.g. by brushing, rolling, spraying and industrial application equipment such as flexo or gravure printing.

The applied coating usually hardens by evaporation of water, i.e. by physical drying. The remaining chain-extended polyurethane material forms a film. This film forming process is supported by the solvent 2,5,7,10-tetraoxaundecane, which helps the chain-extended polyurethane particles to coalesce and forming a macroscopically homogenous film. It is also possible that there is a certain crosslinking taking place during or after the physical drying. But in most applications the curing of the coating is simply a physical process. Optionally, hardening can be supported by heating, but this is usually not necessary.

The invention also relates to a coated article obtained by the process for coating described above.

After application and drying, the final film shows excellent surface quality and its adhesion on various substrates is very good. Particularly surprising is the good adhesion on plastic or rubber substrates. Further particularly surprising is the high ultimate tensile strength of the dried dispersion.

Another embodiment of the invention is the use of 2,5,7,10-tetraoxaundecane as coalescent for water-based polyurethane dispersions, particularly for rigid polyurethane dispersions, which have an elevated glass transition temperature (Tg) and which need a coalescent for film forming at ambient temperatures, particularly at temperatures below 30° C.

Such rigid polyurethane dispersions are typically based on polyester polyols and/or polycarbonate polyols, DMPA and bis(4-isocyanatocyclohexyl) methane, chain extended by a polyamine.

Surprisingly, 2,5,7,10-tetraoxaundecane acts as an efficient film forming aid for rigid polyurethane dispersions. When such a dispersion or a composition containing such a dispersion comprising 2,5,7,10-tetraoxaundecane as a coalescent for the polymer particles is applied at ambient temperature in a thickness in the range of 10 microns to 5 mm, preferably 50 microns to 3 mm, it dries by evaporation of water and optionally other volatile ingredients and forms a rigid, elastic film.

Preferably, 2,5,7,10-tetraoxaundecane is used in an amount in the range of 3 to 60% by weight, preferably 10 to 40% by weight, based on the total weight of the chain-extended polyurethane.

Compared to conventional coalescents such as NMP or NEP, 2,5,7,10-tetraoxaundecane adds additional benefits such as good environmental, health and safety properties and improved adhesive properties, especially on plastic or rubber substrates. Particularly beneficious is the excellent adhesion of polyurethane dispersions containing 2,5,7,10-tetraoxaundecane as coalescent on rigid PVC.

Additionally beneficial is the fact, that 2,5,7,10-tetraoxaundecane can also be used in the preparation of the dispersion, helping to dissolve and dilute components during the production process.

EXAMPLES

1. Preparation of Polyurethane Dispersions:
PUD-TOU-1:
Isocyanate-Terminated Polyurethane Prepolymer:

27.58 parts by weight (pbw) of 2,5,7,10-tetraoxaundecane were placed in a round bottom flask under nitrogen atmosphere. Then 32.31 pbw of molten copolycarbonatediol based on 3/1-mixture of 1,4-cyclohexane dimethanol and 1,6-hexanediol, OH-number 125 mg KOH/g were added under good stirring and the mixture was heated to 60° C. Then 32.23 pbw Desmodur® W (bis(4-isocyanatocyclohexyl)methane, from Covestro) were added under good stirring and the mixture was heated to 80° C. After one hour, 4.45 pbw dimethylol propionic acid were added, followed by 0.06 pbw dibutyl tindilaurate. The mixture was then heated to 90° C. After 3 hours, the isocyanate content of the mixture was 4.71 weight-%. The obtained isocyanate-terminated polyurethane polymer was a clear liquid.
Neutralization:

The obtained isocyanate-terminated polyurethane polymer was cooled down to 70° C. and 3.36 pbw trimethylamine were added under good stirring. The neutralized isocyanate-terminated polyurethane prepolymer containing carboxylate groups and 2,5,7,10-tetraoxaundecane was obtained, which is the precursor for the polyurethane dispersion.

Dispersing and Chain-Extension:

42.65 weight parts (pbw) water were placed in a round bottom flask at a temperature of 25° C. Then 19.72 pbw of the neutralized isocyanate-terminated polyurethane prepolymer described above, which had a temperature of 70° C., were added under very good stirring, while a dispersion was formed. Then, 9.78 pbw ice was added under good stirring and another 19.72 pbw of the neutralized isocyanate-terminated polyurethane prepolymer described above, which had a temperature of 70° C., were added under good stirring to the mixture, followed by the addition of 8.13 pbw of a solution of 30 weight-% Dytee-A (2-methylpentamethylenediamine, from Invista) in water under very good stirring. The mixture was stirred for another 30 min. The obtained water-based polyurethane dispersion was a milky white fluid and contained approximately 58.12% by weight water, 29.65% by weight chain-extended polyurethane and 10.88% by weight 2,5,7,10-tetraoxaundecane.

PUD-NEP-1: (Reference)

The same procedure as described for PUD-TOU-1 was repeated, except that 2,5,7,10-tetraoxaundecane was replaced by the same amount of N-ethyl-2-pyrrolidone.

2. Characterization of Polyurethane Dispersions:

The features of the dispersions are given in Table 1.

Viscosity is the dynamic viscosity determined at 20° C. (Brookfield, spindle 1, 50 rpm).

Solid content was determined by using an infrared-dryer from Mettler Toledo. The ultimate tensile strength (UTS) and the elongation at break (EAB) were determined with a free film according to DIN EN 53504. The free film was prepared by pouring the dispersion into a polypropylene lid in a thickness of 2 to 3 mm (wet), which resulted in a dry film thickness of approx. 1 mm. After 1 day at 23° C./50% rH, the dried film was removed from the lid and flipped over, so that the bottom side was up, and let dry for another 28 days at 23° C./50% rH.

The freeze-thaw stability was determined by storing the dispersion in a closed container for 24 h at −20° C. followed by 24 h at 23° C., repeating this cycle three times. If the dispersion shows no change in aspect, it is judged as stable.

TABLE 1

| | PUD-TOU-1 (inventive) | PUD-NEP-1 (reference) |
|---|---|---|
| viscosity (20° C.) (Centipoise) | 107 | 84 |
| solid content (% by weight) | 32.4 | 35.0 |
| pH | 10.7 | 10.5 |
| average particle size | 30 nm | 23 nm |
| UTS (MPa) | 25.2 | 6.2 |
| EAB (%) | 122 | 354 |
| freeze-thaw stability | stable | stable |

3. Use as Coating:

Both dispersions were used as a coating.

Each dispersion was applied on an aluminium Q-panel from Q-Lab at a wet film thickness of 100 micron, resulting in a dry film thickness of approx. 30 to 32 micron. Each film was dried at 23° C./50% rH for 14 days and used for measuring Pencil Hardness according to ASTM D3363, Persoz Hardness according to ASTM D4366 and adhesion according to ASTM D3359 (crosshatch).

Each dispersion was further applied on plastic substrates (polycarbonate, ABS, Nylon, rigid PVC (uPVC)), in the same way as described for the aluminium Q-panel, and the adhesion was determined according to ASTM D3359 (cross-hatch).

The results are given in Table 2.

TABLE 2

|  | PUD-TOU-1 (inventive) | PUD-NEP-1 (reference) |
| --- | --- | --- |
| Pencil Hardness | H | H |
| Persoz Hardness | 283 | 247 |
| adhesion on aluminium | 7% Loss | 45% Loss |
| adhesion on polycarbonate | 4% Loss | 100% Loss |
| adhesion on ABS | 20% Loss | 100% Loss |
| adhesion on Nylon | 10% Loss | 15% Loss |
| adhesion on rigid PVC | 4% Loss | 70% Loss |

The invention claimed is:

1. A method comprising:
introducing a coalescent comprising 2,5,7,10-tetraoxaundecane into a water-based polyurethane dispersion such that the 2,5,7,10-tetraoxaundecane is present in the water-based polyurethane dispersion in an amount of 10% to 40% by weight based on the total weight of a chain-extended polyurethane in the water-based polyurethane dispersion;
applying the water-based polyurethane dispersion to a surface of a plastic substrate or a rubber substrate to coat the plastic substrate or the rubber substrate such that a thickness of the coating is in the range of 50 microns to 3 mm, wherein the water-based polyurethane dispersion is applied to the plastic substrate or the rubber substrate at a temperature below 30° C.; and
forming a film at a temperature below 30° C. on the plastic substrate or the rubber substrate by evaporation of water of the applied water-based polyurethane dispersion,
wherein the water-based polyurethane dispersion is a rigid polyurethane dispersion, and
wherein the rigid polyurethane dispersion is based on an isocyanate-terminated polyurethane prepolymer that is a reaction product of: (i) a polyester polyol and/or a polycarbonate polyol, (ii) dimethylol propionic acid (DMPA), and (iii) bis(4-isocyanatocyclohexyl) methane, and is chain extended by a polyamine.

2. The method according to claim 1, wherein the plastic substrate or the rubber substrate is a substrate selected from the group consisting of a PVC substrate and polycarbonate substrate.

3. The method according to claim 1, wherein the plastic substrate or the rubber substrate is selected from PVC substrates that are in the form of a plate, a sheet, a fibre, a cable or a textile.

4. The method according to claim 1, wherein the plastic substrate or the rubber substrate is selected from polycarbonate substrates that are in the form of a plate, a sheet, a fibre, a cable or a textile.

5. The method according to claim 1, wherein the film has an ultimate tensile strength of about 25.2 MPa.

6. The method according to claim 5, wherein the film is a rigid, elastic film.

* * * * *